US012080191B2

(12) United States Patent
Wolfe

(10) Patent No.: US 12,080,191 B2
(45) Date of Patent: Sep. 3, 2024

(54) PAN CORNER LABEL

(71) Applicant: Kevin Wolfe, New Richmond, OH (US)

(72) Inventor: Kevin Wolfe, New Richmond, OH (US)

( * ) Notice: Subject to any disclaimer, the term of this patent is extended or adjusted under 35 U.S.C. 154(b) by 0 days.

(21) Appl. No.: 18/063,266

(22) Filed: Dec. 8, 2022

(65) Prior Publication Data

US 2023/0186792 A1 Jun. 15, 2023

Related U.S. Application Data

(60) Provisional application No. 63/287,652, filed on Dec. 9, 2021.

(51) Int. Cl.

| | |
|---|---|
| ***G09F 3/02*** | (2006.01) |
| ***G09F 3/00*** | (2006.01) |
| ***G09F 3/06*** | (2006.01) |

(52) U.S. Cl.

CPC .............. *G09F 3/06* (2013.01); *G09F 3/0291* (2013.01); *G09F 2003/0222* (2013.01); *G09F 2003/0266* (2013.01); *G09F 2003/0272* (2013.01)

(58) Field of Classification Search

CPC .. G09F 3/06; G09F 3/0291; G09F 2003/0222; G09F 2003/0266; G09F 2003/0272; B65D 5/4212; B65D 5/425; B65D 5/4233; B65D 23/14; B65D 25/205; B65D 51/245; B65D 2203/02; B65D 2501/24878; B65D 2501/24885

USPC ............................ 206/459.1, 459.5; D9/737

See application file for complete search history.

(56) References Cited

U.S. PATENT DOCUMENTS

| | | | | |
|---|---|---|---|---|
| 2,859,905 | A * | 11/1958 | Choate | B65D 5/28 229/125.17 |
| 3,422,986 | A * | 1/1969 | Tilseth | A47G 19/02 D7/396.1 |
| 10,206,528 | B1 * | 2/2019 | Lequio Di Assaba | A47G 23/0633 |
| 11,014,702 | B1 * | 5/2021 | Wilson | B65D 5/006 |
| 2003/0113228 | A1 * | 6/2003 | Goldsmith | G01N 33/02 436/1 |
| 2004/0068902 | A1 * | 4/2004 | Hadzic | G09F 3/16 40/316 |
| 2009/0142454 | A1 * | 6/2009 | Clark | B65D 1/40 426/396 |
| 2010/0180477 | A1 * | 7/2010 | Monaghan | G09F 3/00 40/324 |

(Continued)

FOREIGN PATENT DOCUMENTS

GB 1247340 A * 9/1971

*Primary Examiner* — Cassandra Davis

(74) *Attorney, Agent, or Firm* — Brennan, Manna & Diamond, LLC

(57) ABSTRACT

A food safety device for limiting cross contamination and preventing food borne illnesses. The food safety device is attachable and securable to a rim of a food holding or storage container on an edge or corner of the food storage or holding container. A flexible body is designed to fit over and frictionally engage the rim of the food storage container. The flexible body may secure to a corner or a side of the food storage or holding container. A labeling component allows food preparers and consumers to readily identify the stored foods and the ingredients. The labeling component may be pre-labeled, color coded, or adjustable.

14 Claims, 10 Drawing Sheets

(56) References Cited

U.S. PATENT DOCUMENTS

2014/0137446 A1* 5/2014 Monaghan ................ G09F 3/00
248/542

* cited by examiner

PAN CORNER LABEL

CROSS-REFERENCE TO RELATED APPLICATION

The present application claims priority to, and the benefit of, U.S. Provisional Application No. 63/287,652, which was filed on Dec. 9, 2021 and is incorporated herein by reference in its entirety.

FIELD OF THE INVENTION

The present invention generally relates to the field of food safety while preparing and serving food. More specifically, the present invention relates to a food safety device for preventing foodborne illnesses or cross contamination from the improper handling and storage of food. Accordingly, the present specification makes specific reference thereto. However, it is to be appreciated that aspects of the present invention are also equally amenable to other like applications, devices, and methods of manufacture.

BACKGROUND

Every year, millions of people suffer from some type of food related illness. Many of these foodborne illnesses are entirely preventable. These illnesses are often caused by the improper storage and handling of both cooked and raw foods during both preparation and service. Foodborne illnesses can be caused from consuming food that has been contaminated by pathogens or disease-causing microbes. Cross-contamination is the physical movement or transfer of harmful bacteria between objects or places and people.

One common issue is the improper use of food preparation equipment. This can include using the same equipment or containers for preparing and storing foods that should be kept separate. Further, many employees are not properly trained or regularly reminded on the use of proper preparation, cleaning, and sanitizing protocols. Raw foods, such as meat, poultry, and fish, should never be stored near ready-to-eat foods like cooked foods, fruits, salads, or desserts. The raw food may splash or drip onto the ready-to-eat food and result in cross-contamination. For safety, any food item not stored in its original packaging should be labeled and isolated to avoid confusion.

These issues are exacerbated in commercial food preparation centers, such as restaurants, cafeterias, food kitchens, bars, hotels, and other eateries. Complying with food safety rules and regulations is a difficult task. It only takes one mistake during the preparation of or storage for a foodborne illness to break out. While local health departments provide general oversight for commercial food preparation businesses, it is not possible to continuously monitor every business.

Food allergies are another common source of food related illnesses. A food allergy is an immune system reaction that occurs soon after eating a certain food. Even a small amount of the allergy-causing food can trigger signs and symptoms such as digestive problems, hives, or swollen airways. In some people, a food allergy can cause severe symptoms or even a life-threatening reaction known as anaphylaxis. It is therefore critical that food preparers be aware of the ingredients in a dish. It is similarly important for the food consumer to be able to easily determine the ingredients.

When working in a restaurant, there are inevitably several pans and dishes in the kitchen area or food preparation area. Employees may be unaware of what items are stored in which pan or dish just by looking. Cross-contamination can easily occur, and expensive food items and ingredients may need to be thrown away. People with certain allergens may have a reaction if any food is not properly segregated within the kitchen.

Accordingly, there is a great need for a food safety device that can simply adhere to the edge of a pan, dish, or other container used for food preparation and storage. There is also a need for a labeling mechanism to quickly and easily show employees what type of item or ingredient is stored in each pan or dish. There is also a need for a simple way to prevent cross contamination during food preparation. Further, there is a need for a device designed to mitigate food allergy risks.

In this manner, the novel and improved food safety device of the present invention accomplishes all of the foregoing objectives, thereby providing an easy solution to decrease the likelihood of foodborne illnesses during food preparation and service. A primary feature of the present invention provides users with a secure silicone covering used to adhere to the edge of a pan, dish, or other container used for food preparation and storage. The device functions as a labeling mechanism, ensuring employees are readily aware of what type of item or ingredient is stored in each pan or dish. Further, the improved food safety device and system of the present invention is capable of limiting cross contamination and allergen risks, along with incorrect ordering for the kitchen.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one embodiment thereof, comprises a food safety device. The food safety device is configured for use with a food holding or food storage container. The food storage holding or food storage container may be a food service tray, pan, dish, or the like. The food safety device comprises a body and a labeling component integrated or attached to the body.

The body is a flexible body comprising a top, a bottom, an outer sidewall, and an inner sidewall. The body further comprises a first wing and a second wing. The second wing extends perpendicularly from the first wing at a corner. The body is shaped to engage a food holding container having a corner. The body fits over and frictionally engage a rim or edge of the food holding container.

The inner sidewall comprises a rim engaging groove. The rim engaging groove is molded, cut, or otherwise integrated into the inner sidewall. The rim engaging groove is shaped to extend around and encapsulate the rim or edge of the food holding container. The rim engaging groove may be an ogee shaped, horseshoe shaped, curved, or angled groove. The rim engaging groove may further comprise a flexible stop member. The flexible stop member is configured to engage an underside of the rim to keen the body in place on the food holding container.

The labeling component is integrated into or attachable to a top of the body or the outer sidewall. The labeling component may be color coded to indicate a type of food or ingredient stored within the food holding container. The labeling component may comprise a first labeling element and a second labeling element. The first or second labeling elements may be a word label, a symbol label, a warning label, a measurement label, or the like.

The food safety device may further comprising a contamination indicator. The contamination indicator may be integrated into or attachable to a top of the body or the outer sidewall. The indicating component indicates the presence of or a lack of contamination on the body of the food safety device.

In an alternative embodiment, the subject matter disclosed and claimed herein, in one embodiment thereof, comprises a food safety device. The food safety device is configured for use with a food holding or food storage container. The food storage holding container may be a food service tray, pan, dish, or the like. The food safety device comprises a body and a labeling component integrated or attached to the body.

The body is a flexible body comprising a top, a bottom, an outer sidewall, and an inner sidewall. The body is shaped to engage the food storage holding container along a straight or curved edge. The body fits over and frictionally engage a rim or edge of the food holding container.

The inner sidewall comprises a rim engaging groove. The rim engaging groove is molded, cut, or otherwise integrated into the inner sidewall. The rim engaging groove is shaped to extend around and encapsulate the rim or edge of the food holding container. The rim engaging groove may be an ogee shaped, horseshoe shaped, curved, or angled groove. The rim engaging groove may further comprise a flexible stop member. The flexible stop member is configured to engage an underside of the rim to keen the body in place on the food holding container.

The labeling component is integrated into or attachable to a top of the body or the outer sidewall. The labeling component may be color coded to indicate a type of food or ingredient stored within the food holding or food storage container. The labeling component may comprise a first labeling element and a second labeling element. The first or second labeling elements may be a word label, a symbol label, a warning label, a measurement label, or the like.

The food safety device may further comprising a contamination indicator. The contamination indicator may be integrated into or attachable to a top of the body or the outer sidewall. The indicating component indicates the presence of or a lack of contamination on the body of the food safety device.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
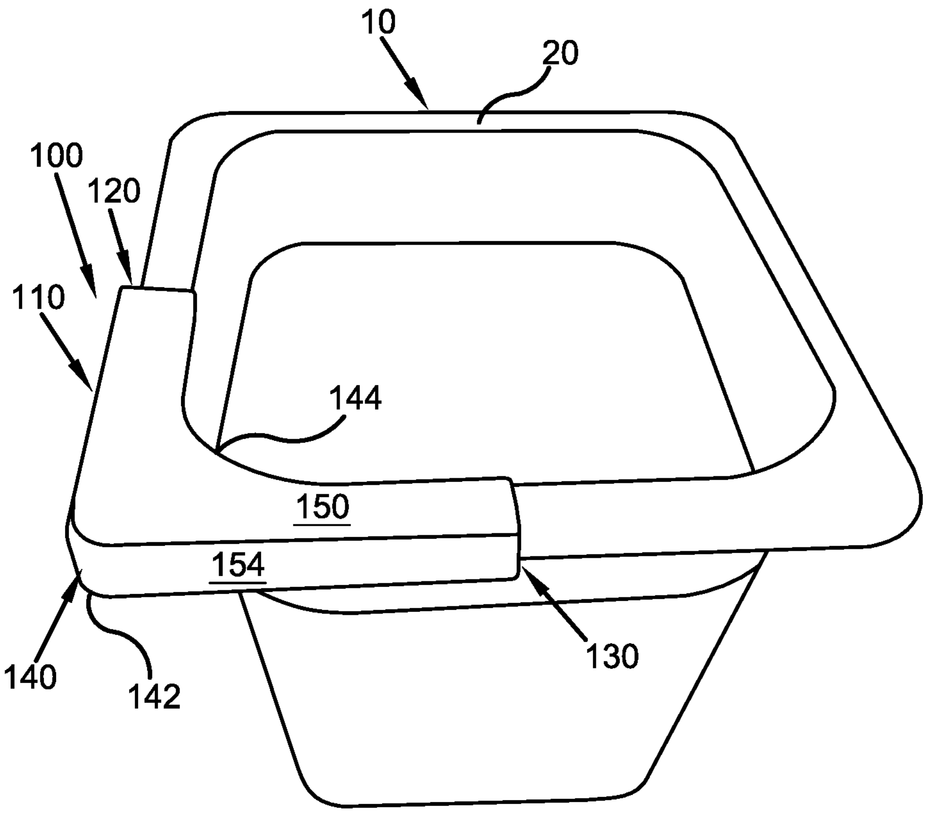
FIG. 1 illustrates a perspective view of one embodiment of a food safety device of the present invention for use with a food holding container in accordance with the disclosed architecture.
Figure 2:
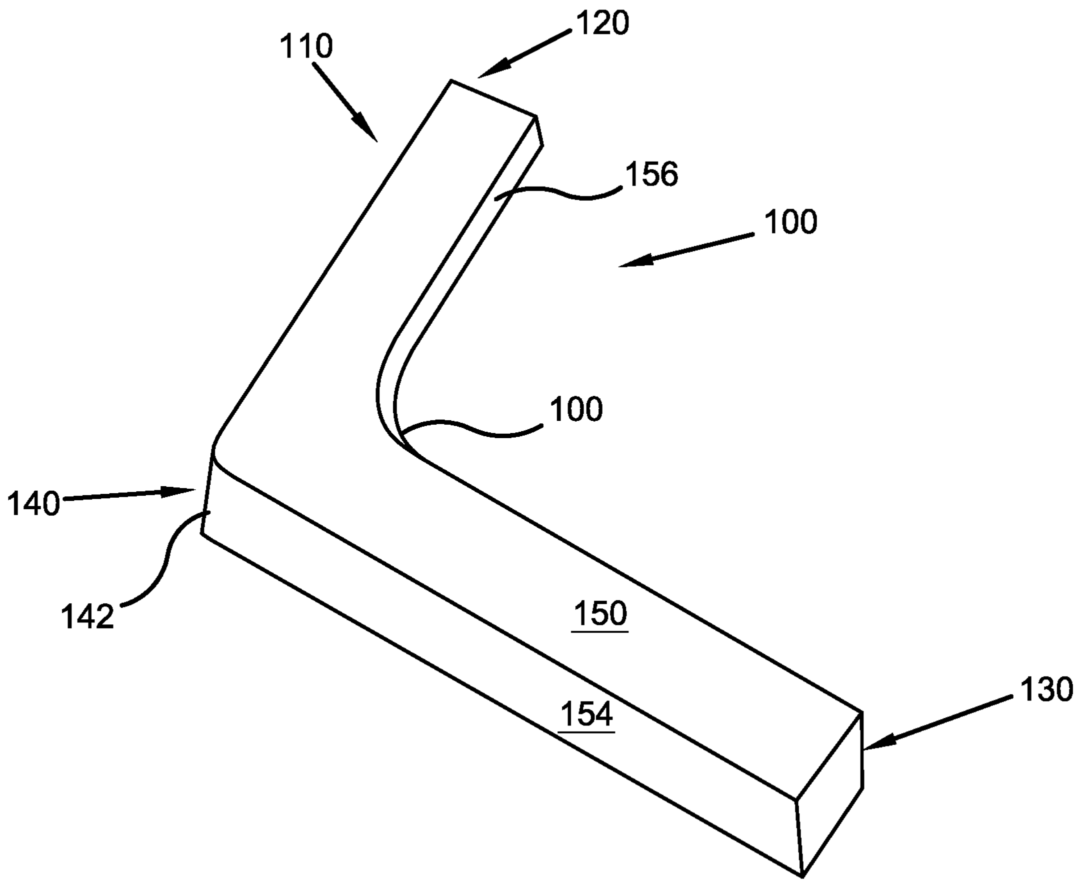
FIG. 2 illustrates a perspective view of the food safety device of the present invention for use with the food holding container in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They do not intend as an exhaustive description of the invention or do not limit the scope of the invention. Additionally, an illustrated embodiment need not have all the aspects or advantages shown. Thus, in other embodiments, any of the features described herein from different embodiments may be combined.

The present invention, in one exemplary embodiment, is a silicone label device that can attach to and over the corner of a pan or dish. The corner cover allows users to easily label the contents of a pan or dish, especially useful for those in restaurants, hotels, bars, and more. The cover maintains easy identification of items stored in the pan or dish to prevent cross-contamination. Users can slide the silicone cover over the corner of the pan via a small channel on the edge of the cover. The channel adheres the device firmly to the pan or dish corner with ease. The device can be constructed using 100% food grade silicone or other suitable materials. Exact size, measurement, construction, and design specifications may vary upon further development and manufacturing.

Referring initially to the drawings, FIGS. 1-7C illustrate a food safety device 100 for use with a food storage container 10. The food safety device 100 is configured for use with the food holding container 10 having a rim 20. The food holding container 10 may be a food storage container, a food service tray, pan, dish, or the like having a rim or edge used in food preparation, service, or temporary storage of food. The food holding container 10 may be a generally square or rectangular container having corners. The food safety device 100 is designed to clearly mark or indicate contents in a metal, plastic, glass, ceramic, or stoneware food service pan or tray.

As illustrated in FIGS. 1, 2, 4, and 5, the food safety device 100 comprises a body 110 and a labeling component 170. The labeling component 170 is integrated or otherwise attached to the body 110 as discussed infra. The body 110 is a flexible body and is typically constructed from a food grade silicon, rubber, plastic, or similar polymer materials so that the body 110 can stretch and bend. The body 110 may also be constructed from or coated with an anti-microbial or anti-bacterial material. The body 110 may also be fluorescent or color coded. The colors may be chosen to further indicate a type of food, such as meat, poultry, fish, or the like for easily visualizing the contents and warning a user to keep certain foods separate. The colors may also be used to further indicate an ingredient, such as an ingredient common in food allergies.

The body 110 comprises a top 150, a bottom 152, an outer sidewall 154, and an inner sidewall 156. The outer sidewall 154 is positioned along an outside of the food holding container 10 and is taller than the inner sidewall 156 which is positioned along an inside of the food holding container 10. The top 150 is positioned over a top of the rim 20.

The body 110 further comprises a first wing 120 and a second wing 130. The second wing 130 extends substantially perpendicularly from the first wing 120 at or along a corner 140. The body 110 is shaped to engage the food holding container 10 around the corner. The body 110 fits over and frictionally engages the rim 20 or edge of the food holding container 10. The corner 140 comprises an inside edge 142 and an outside edge 144. The inside edge 142 may be a more rounded corner than the outside edge 144 to better fit a rounded corner of the food holding container 10.

Figure 3:
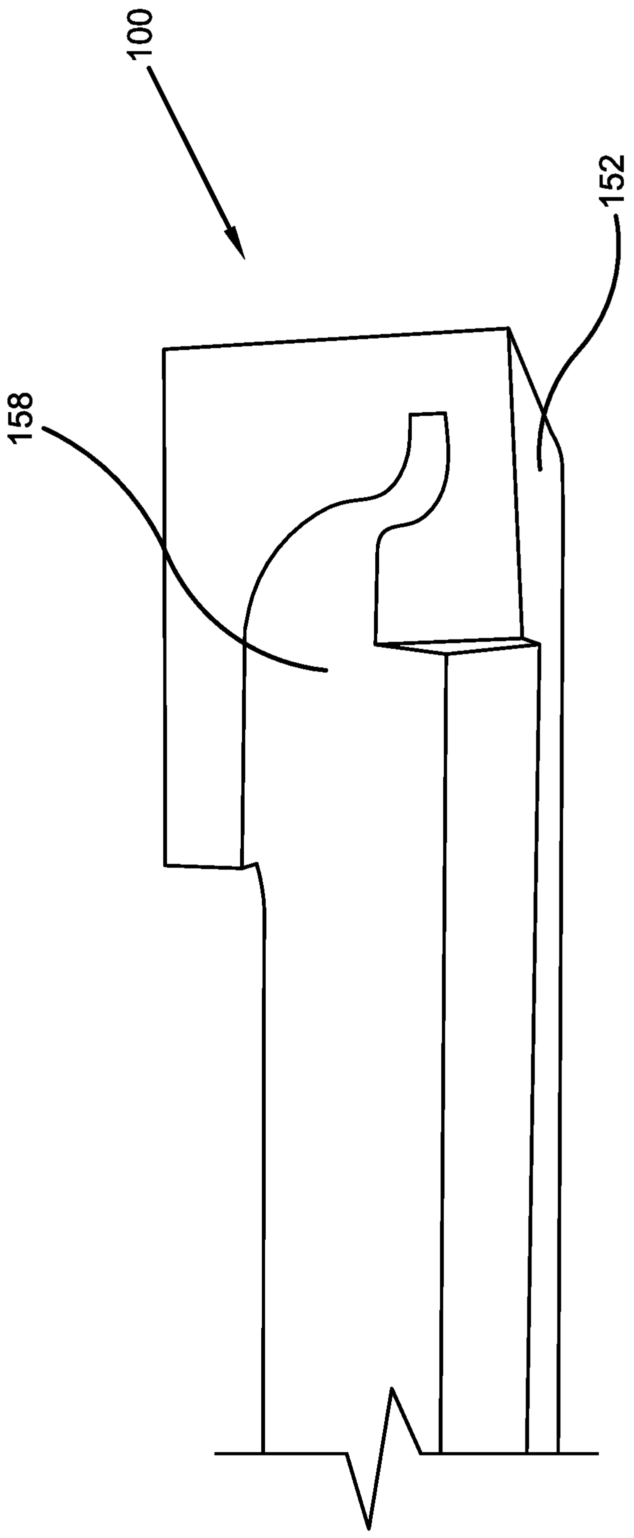
FIG. 3 illustrates a side view of the food safety device of the present invention for use with the food holding container in accordance with the disclosed architecture.
Figure 4:
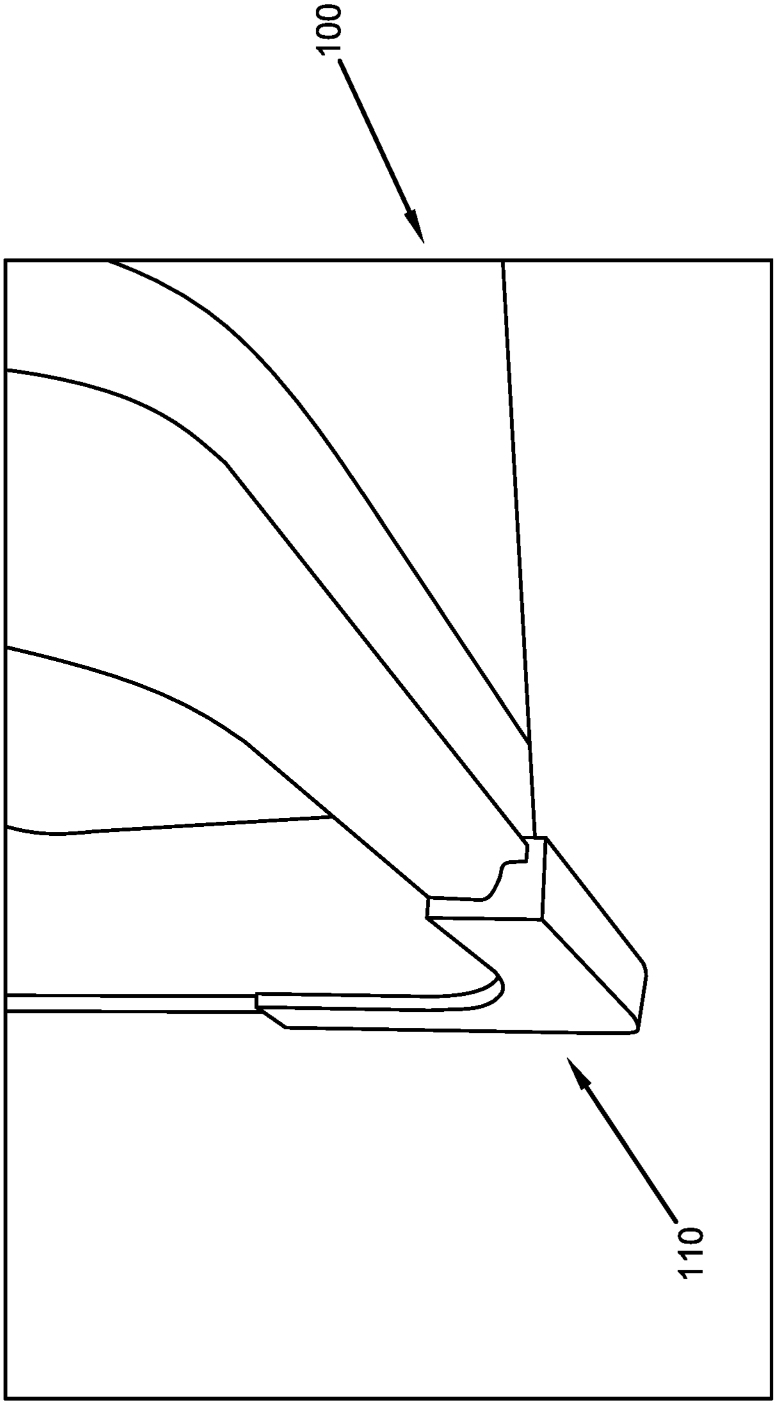
FIG. 4 illustrates a perspective view of a rim engaging groove of the food safety device of the present invention for use with the food holding container in accordance with the disclosed architecture.
Figure 5:
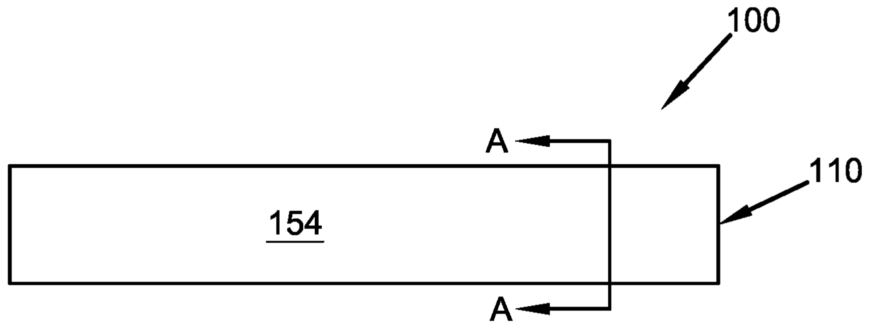
FIG. 5 illustrates a side view of the food safety device of the present invention for use with the food holding container in accordance with the disclosed architecture.

As illustrated in FIG. 3, the inner sidewall 156 comprises a rim engaging groove 158. The rim engaging groove 158 is molded, cut, or otherwise integrated into the inner sidewall 156. The rim engaging groove 158 is shaped to extend around, encapsulate, and frictionally engage the rim 20 or edge of the food holding container 10. The rim engaging groove 158 flexibly separates to accommodate the rim 20 while placing the food safety device 100 on the food holding container 10 then retracts back in place.

Figure 6A:
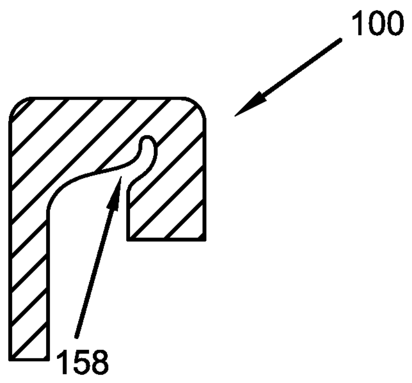
FIG. 6A illustrates a cutaway view along line A-A of FIG. 5 of the food safety device of the present invention for use with the food holding container in accordance with the disclosed architecture.
Figure 6B:
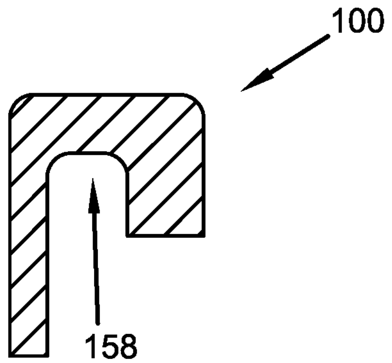
FIG. 6B illustrates a cutaway view along line A-A of FIG. 5 of the food safety device of the present invention for use with the food holding container in accordance with the disclosed architecture.
Figure 6C:
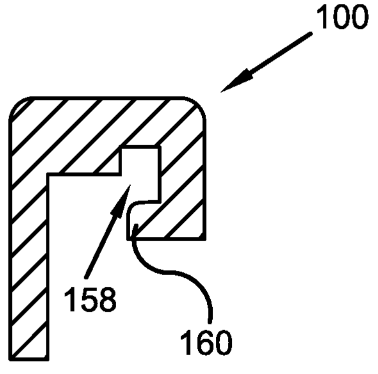
FIG. 6C illustrates a cutaway view along line A-A of FIG. 5 of the food safety device of the present invention for use with the food holding container in accordance with the disclosed architecture.

As illustrated in FIGS. 6A-6C, the rim engaging groove 158 may be an ogee shaped, horseshoe shaped, curved, or angled groove. The rim engaging groove 158, may further comprise a flexible stop member 160. The flexible stop member 160 may be a gasket or protuberance that is configured to engage an underside of the rim 10 to keep the body 110 in place on the food holding container 10.

Figure 7A:
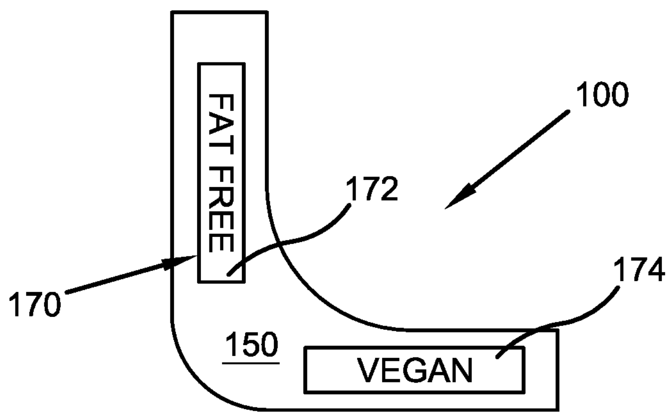
FIG. 7A illustrates a top view of the food safety device of the present invention for use with the food holding container in accordance with the disclosed architecture.
Figure 7B:
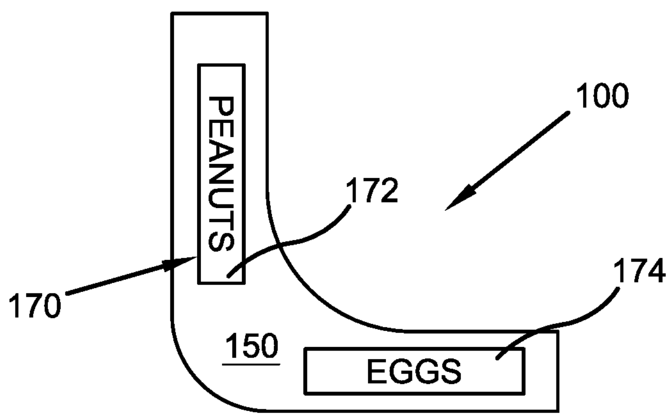
FIG. 7B illustrates a top view of the food safety device of the present invention for use with the food holding container in accordance with the disclosed architecture.
Figure 7C:
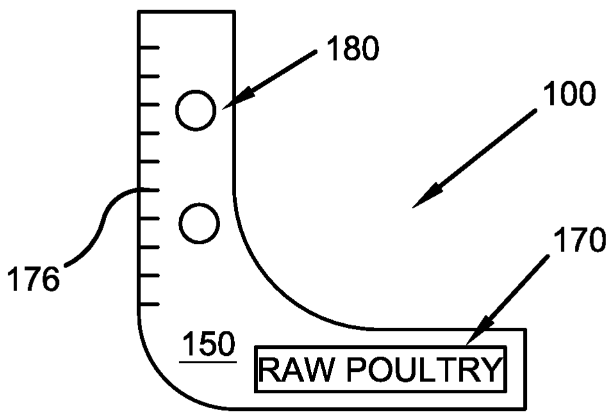
FIG. 7C illustrates a top view of the food safety device of the present invention for use with the food holding container in accordance with the disclosed architecture.

As illustrated in FIGS. 7A-7C, the labeling component 170 is integrated into or attachable to the top 150 of the body 110 or to the outer sidewall 154. The labeling component 170 may also be color coded to indicate a type of food or ingredient stored within the food holding container 10 similarly to the body 110 as discussed supra. The labeling component 170 may comprise a first labeling element 172 and a second labeling element 174. The first or second labeling elements 172 and 174 may be a word label, a symbol label, a warning label, an instructional label, or the like. For example, the first and second labeling elements 172 and 174 may indicate type of food, such as meat, poultry, fish, or the like, or a common allergy ingredient for easily visualizing the contents and warning a user to keep certain foods separate. The labeling component 170 may further comprise a measuring element 176. Alternatively, additional labels may be included. The labeling component 170 may also be customizable, such as having a surface for temporary marking, tagging, or labeling, such as with a grease pencil or marker.

The food safety device 100 may further comprising a contamination indicator 180. The contamination indicator 180 may be integrated into or attachable to the top 150 of the body 110 or the outer sidewall 154. The indicating component 180 is configured to indicate the presence of or a lack of contamination on the body 110, such as the presence of bacteria or other contamination. The indicating component 180 may be a colorimetric indicator and may be replaceable.

Figure 8:
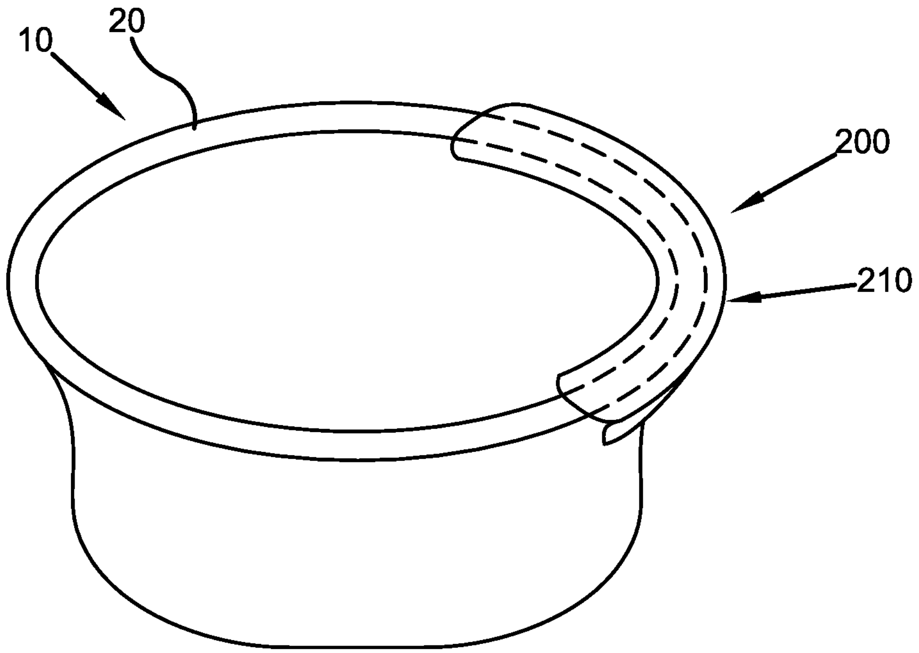
FIG. 8 illustrates a perspective view of one embodiment of a food safety device of the present invention for use with a food holding container in accordance with the disclosed architecture.
Figure 9:
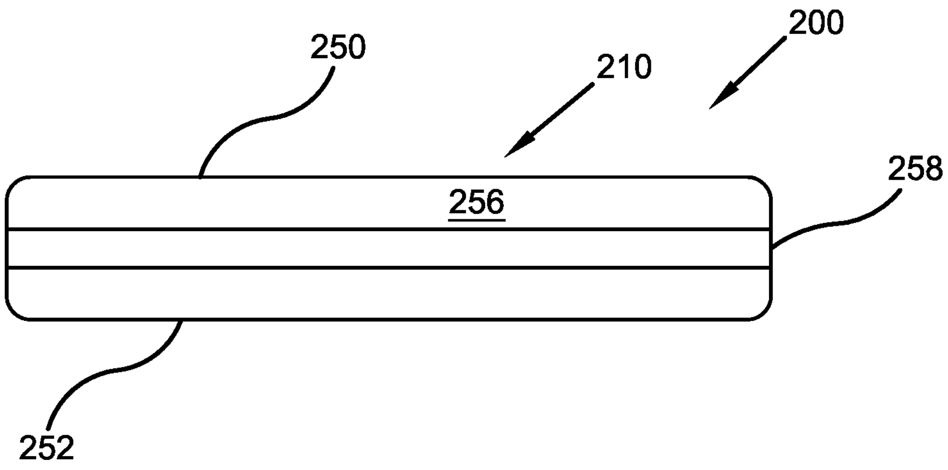
FIG. 9 illustrates a side view of one embodiment of a food safety device of the present invention for use with a food holding container in accordance with the disclosed architecture.
Figure 10:
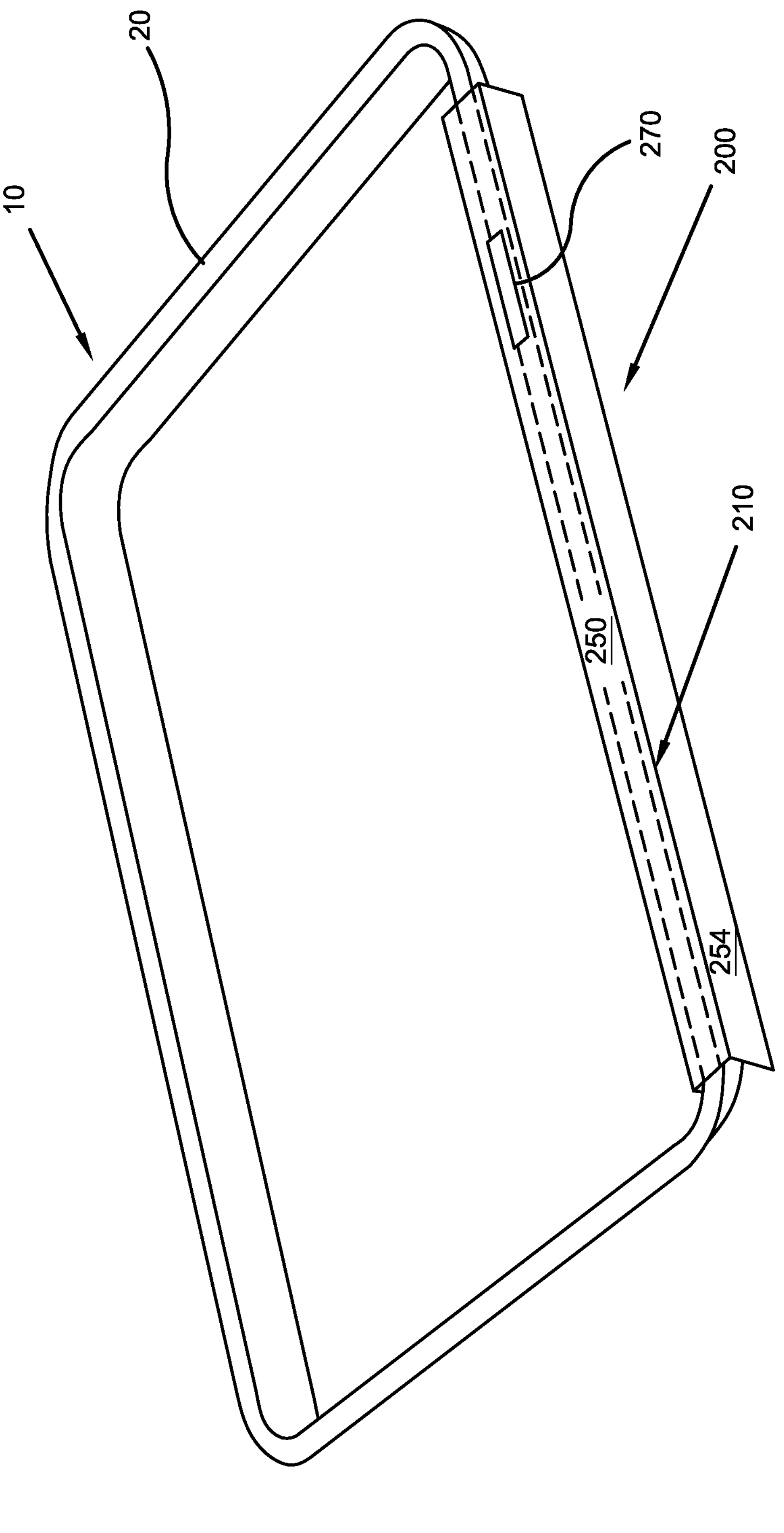
FIG. 10 illustrates a perspective view of the food safety device of the present invention for use with a food holding container in accordance with the disclosed architecture.

In an alternative embodiment as illustrated in FIGS. 8-10, the subject matter disclosed and claimed herein, in one embodiment thereof, comprises a food safety device 200. The food safety device 200 is configured for use with a food holding container 10 having a rim 20. The food holding container 10 may be a food storage container, a food service tray, pan, dish, or the like having a rim or edge used in food preparation, service, or storage. The food holding container 10 may be generally circular or oval, or may have a straight edge.

The food safety device 200 comprises a body 210 and a labeling component 270. The labeling component 270 is integrated or otherwise attached to the body 210 as discussed infra. The body 210 is a flexible body and is typically constructed of a food grade silicon, rubber, plastic, or similar polymer materials so that it can stretch and bend. The body 210 may also be constructed from or coated with an anti-microbial or anti-bacterial material. The body 210 may also be fluorescent or color coded. The colors may be used to further indicate a type of food, such as meat, poultry, fish, or the like for easily visualizing the contents and warning a user to keep certain foods separate. The colors may also be used to further indicate an ingredient, such as an ingredient common in food allergies.

The body 210 is a flexible body and comprises a top 250, a bottom 252, an outer sidewall 254, and an inner sidewall 256. The outer sidewall 254 is positioned along an outside of the food holding container 10 and is taller than the inner sidewall 256 positioned along an inside of the food holding container 10. The top 250 is positioned over a top of the rim 20. The body 210 is shaped to engage the food storage holding container 10 along a straight or curved edge. The body 210 fits over and frictionally engages the rim 20 or edge of the food holding container 10.

The inner sidewall 256 comprises a rim engaging groove 258. The rim engaging groove 258 is molded, cut, or otherwise integrated into the inner sidewall 256. The rim engaging groove 258 is shaped to extend around, encapsulate, and frictionally engage the rim 20 or edge of the food holding container 10. The rim engaging groove 258 flexibly separates to accommodate the rim 20 while placing the food safety device 200 on the food holding container 10 then retracts back in place.

The rim engaging groove 258 may be an ogee shaped, horseshoe shaped, curved, or angled groove. The rim engaging groove 258, may further comprise a flexible stop member (similar to 160). The flexible stop member may be a gasket or protuberance that is configured to engage an underside of the rim 10 to keep the body 210 in place on the food holding container 10.

The labeling component 270 is integrated into or attachable to the top 250 of the body 210 or to the outer sidewall 254. The labeling component 270 may also be color coded to indicate a type of food or ingredient stored within the food holding container 10 similarly to the body 210 as discussed supra. The labeling component 270 may comprise a first labeling element (similar to 172) and a second labeling element (similar to 174). The first or second labeling elements may be a word label, a symbol label, a warning label, an instructional label, or the like. For example, the first and second labeling elements may indicate type of food, such as meat, poultry, fish, or the like, or a common allergy ingredient for easily visualizing the contents and warning a user to keep certain foods separate. The labeling component 270 may further comprise a measuring element (similar to 176). Alternatively, additional labels may be included. The labeling component 270 may also be customizable, such as having a surface for temporary marking, tagging, or labeling.

The food safety device 200 may further comprising a contamination indicator (similar to 180). The contamination indicator may be integrated into or attachable to the top 250 of the body 210 or the outer sidewall 254. The indicating component is configured to indicate the presence of or a lack of contamination on the body 210, such as the presence of bacteria or other contamination. The indicating component may be a colorimetric indicator and may be replaceable.

It is contemplated that the food safety devices 100 and 200 constructed in accordance with the present invention will be tailored and adjusted by those of ordinary skill in the art to accommodate various levels of performance demand imparted during actual use. Accordingly, while this invention has been described by reference to certain specific embodiments and examples, it will be understood that this invention is capable of further modifications. This application is, therefore, intended to cover any variations, uses or adaptations of the invention following the general principles thereof, and including such departures from the present disclosure as come within known or customary practice in the art to which this invention pertains and fall within the limits of the appended claims.

Notwithstanding the foregoing, the food safety devices 100 and 200 of the present invention and its various structural components can be of any suitable size, shape, and configuration as is known in the art without affecting the overall concept of the invention, provided that it accomplishes the above stated objectives. One of ordinary skill in the art will appreciate that the shape and size of the food safety devices 100 and 200 and their various components and material, as shown in the FIGS. are for illustrative purposes only, and that many other shapes and sizes of the food safety devices 100 and 200 are well within the scope of the present disclosure. Although the dimensions of the food safety devices 100 and 200 are important design parameters, the food safety devices 100 and 200 and their components may be of any shape or size that ensures optimal performance during use and/or that suits user need and/or preference.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A food safety device for use with a food holding container, the food safety device comprising:

a body comprising a first wing and a second wing extending from the first wing at a corner; and a labeling component integrated into the body; and a contamination indicator;

wherein the body is configured to fit over and frictionally engage a rim of the food holding container; and wherein the body is antimicrobial; and wherein the body is fluorescent for improving visibility of contents within the food holding container.

2. The food safety device of claim 1, wherein the second wing extends perpendicularly from the first wing.

3. The food safety device of claim 1, wherein the body is flexible.

4. The food safety device of claim 1, wherein the body further comprises a rim engaging groove in an inner sidewall of the body.

5. The food safety device of claim 4, wherein the rim engaging groove is an ogee shaped groove.

6. The food safety device of claim 1, wherein the labeling component is color coded.

7. The food safety device of claim 1, wherein the labeling component comprises a first labeling element and a second labeling element.

8. The food safety device of claim 7, wherein at least one of the first or second labeling elements is a word label.

9. The food safety device of claim 7, wherein at least one of the first or second labeling elements is a symbol label.

10. A food safety device for use with a food holding container, the food safety device comprising:

a flexible body comprising a top, a bottom, an outer sidewall, and an inner sidewall comprising a rim engaging groove; and a labeling component integrated into the flexible body; and a colorimetric contamination indicator attached to the top of the flexible body; and wherein the flexible body is configured to fit over and frictionally engage a rim of the food holding container; and wherein the flexible body further comprises a first wing and a second wing extending from the first wing at a corner; and wherein the flexible body is fluorescent for improving visibility of contents within the food holding container.

11. The food safety device of claim 10, wherein the rim engaging groove is an ogee shaped groove.

12. The food safety device of claim 10, wherein the rim engaging groove is a horseshoe shaped groove.

13. The food safety device of claim 10, wherein the rim engaging groove comprises a flexible stop member for engaging an underside of the rim of the food holding container.

14. A food safety device for use with a food holding container, the food safety device comprising:

a flexible body comprising a first wing, a second wing extending from the first wing at a corner, a top, a bottom, an outer sidewall, and an inner sidewall comprising a rim engaging groove;

a labeling component integrated into the flexible body, the labeling component color coded and comprising a first and a second labeling elements; and an indicating component attachable to the flexible body; and wherein the flexible body is configured to fit over and frictionally engage a rim of the food holding container; and wherein the flexible body is antimicrobial; and wherein the indicating component is a replaceable colorimetric indicator configured to change color in the presence of contamination.

* * * * *